US011263203B2

(12) United States Patent
Barve et al.

(10) Patent No.: US 11,263,203 B2
(45) Date of Patent: Mar. 1, 2022

(54) SYSTEMS AND METHODS FOR STORING DATA IN AN INTEGRATED ARRAY AND LINKED LIST BASED STRUCTURE

(71) Applicant: Tata Consultancy Services Limited, Mumbai (IN)

(72) Inventors: Mahesh Damodar Barve, Pune (IN); Sunil Anant Puranik, Pune (IN); Manoj Nambiar, Thane (IN); Swapnil Rodi, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 160 days.

(21) Appl. No.: 16/663,760

(22) Filed: Oct. 25, 2019

(65) Prior Publication Data

US 2020/0133942 A1    Apr. 30, 2020

(30) Foreign Application Priority Data

Oct. 26, 2018  (IN) .............................. 201821040565

(51) Int. Cl.
*G06F 16/23* (2019.01)
*G06F 16/901* (2019.01)

(52) U.S. Cl.
CPC ...... *G06F 16/2379* (2019.01); *G06F 16/9024* (2019.01)

(58) Field of Classification Search
None
See application file for complete search history.

(56) References Cited

U.S. PATENT DOCUMENTS

2002/0174147 A1    11/2002  Wang et al.
2003/0125993 A1 *   7/2003  Ho ........................ G06Q 10/02
                                                    705/5

(Continued)

FOREIGN PATENT DOCUMENTS

CN       106598570       4/2017
KR       2017-0035879    3/2017

OTHER PUBLICATIONS

Hassan, S.A. et al. (2017). "An Efficient Scheme for Real-time Information Storage and Retrieval Systems: A Hybrid Approach," (*IJACSA*) *International Journal of Advanced Computer Science and Applications*, vol. 8, No. 8; pp. 427-431.

*Primary Examiner* — Richard L Bowen
(74) *Attorney, Agent, or Firm* — Finnegan, Henderson, Farabow, Garrett & Dunner, LLP

(57) ABSTRACT

Data processing and storage is an important part of a number of applications. Conventional data processing and storage systems utilize either a full array structure or a full linked list structure for storing data wherein the array consumes large amount of memory and linked list provides slow processing. Thus, conventional systems and methods are not capable of providing simultaneous optimization of memory consumption and time efficiency. The present disclosure provides an efficient way of storing data by creating an integrated array and linked list based structure. The data is stored in the integrated array and linked list based structure by using a delta based mechanism. The delta based mechanism helps in determining the location in the integrated array and linked list based structure where the data should be stored. The present disclosure incorporates the advantages of both array and linked list structure resulting in reduced memory consumption and latency.

15 Claims, 5 Drawing Sheets

(56) References Cited

U.S. PATENT DOCUMENTS

2009/0319549 A1    12/2009  Millett
2010/0031003 A1*   2/2010   Chen .................... G06F 9/3891
                                                        712/30
2010/0205160 A1*   8/2010   Kumar ................ G06F 16/2272
                                                        707/696
2016/0104227 A1*   4/2016   Gauthier ............ G06F 16/9024
                                                        705/26.62

* cited by examiner

SYSTEMS AND METHODS FOR STORING DATA IN AN INTEGRATED ARRAY AND LINKED LIST BASED STRUCTURE

PRIORITY CLAIM

This U.S. patent application claims priority under 35 U.S.C. § 119 to Indian Application No. 201821040565, filed on Oct. 26, 2018. The entire contents of the aforementioned application are incorporated herein by reference.

TECHNICAL FIELD

The disclosure herein generally relates to field of data storage and processing, more particularly, to systems and methods for storing data in an integrated array and linked list based structure.

BACKGROUND

Data storage is a critical part of data processing systems. The emergence and growing emphasis on big data & data mining for numerous applications requires collecting a large amount of data. Further, a number of operations are required to be performed for meaningful analysis and presentation of the data. Data storage becomes important for performing operations on the data such that the latency for operations such as search, insert, delete and the like should be minimum with adequate memory usage.

Conventional systems comprise either fully linked list based structure or fully array based data structure for storing data. Storage using fully array based data structure requires an array of very large size and results in wastage of memory. The fully linked list based structure introduces a time penalty due to every insertion which requires traversing the linked list to get the appropriate node.

SUMMARY

Embodiments of the present disclosure present technological improvements as solutions to one or more of the above-mentioned technical problems recognized by the inventors in conventional systems. For example, in one aspect, there is provided a processor implemented method, comprising: receiving a plurality of input data and a corresponding reference data for each of the plurality of input data; creating a data structure for storing the plurality of input data, wherein the data structure is created in at least one form comprising an array structure or a linked list, and wherein the created data structure further comprises a plurality of data pointers defined for each of the plurality of input data; determining a unique set of data pointers from the plurality of data pointers for each of the plurality of input data, wherein the unique set of data pointers is determined by computing a range of candidate data pointers varying around the corresponding reference data. In an embodiment, the range is configurable and is determined based on the corresponding reference data. The processor implemented method further comprising defining, (i) the unique set of data pointers in the array structure and (ii) remaining data pointers from the plurality of data pointers, in the linked list; determining for a new input data, using a delta based mechanism, a data pointer, from one of (i) the unique set of data pointers defined in the array structure or (ii) the remaining data pointers from the plurality of data pointers, in the linked list, wherein during determination of the data pointer a node corresponding to the determined data pointer is created. In an embodiment, the delta based mechanism determines a difference between value of the reference data and the new input data, and wherein the difference is indicative of an index value for determining the data pointer. In an embodiment, the method further comprising forming another linked list from the created node corresponding to the determined data pointer for storing subsequent input data. The processor implemented method further comprising storing, the new input data at an address of one of the array structure or the linked list pointed by the determined node associated with the data pointer. In an embodiment, the method further comprising dynamically updating at least one of the array structure and the linked list based on the incoming input data and the reference data.

In another aspect, there is provided a system comprising: a memory storing instructions; one or more communication interfaces; and one or more hardware processors coupled to the memory through the one or more communication interfaces, wherein the one or more hardware processors are configured by the instructions to receive a plurality of input data and a corresponding reference data for each of the plurality of input data; creating a data structure for storing the plurality of input data, wherein the data structure is created in at least one form comprising an array structure or a linked list, and wherein the created data structure further comprises a plurality of data pointers defined for each of the plurality of input data; determining a unique set of data pointers from the plurality of data pointers for each of the plurality of input data, wherein the unique set of data pointers is determined by computing a range of candidate data pointers varying around the corresponding reference data. In an embodiment, the range is configurable and is determined based on the corresponding reference data. In an embodiment, the range is configurable and is determined based on the corresponding reference data. The system comprising of one or more hardware processors are further configured by the instructions to define, (i) the unique set of data pointers in the array structure and (ii) remaining data pointers from the plurality of data pointers, in the linked list; determine for a new input data, using a delta based mechanism, a data pointer, from one of (i) the unique set of data pointers defined in the array structure or (ii) the remaining data pointers from the plurality of data pointers, in the linked list, wherein during determination of the data pointer a node corresponding to the determined data pointer is created. In an embodiment, the delta based mechanism determines a difference between value of the reference data and the new input data, and wherein the difference is indicative of an index value for determining the data pointer. In an embodiment, the one or more hardware processors are further configured by the instructions to form another linked list from the created node corresponding to the determined data pointer for storing subsequent input data. The system comprising of one or more hardware processors are further configured by the instructions to store, the new input data at an address of one of the array structure or the linked list pointed by the determined node associated with the data pointer. In an embodiment, the one or more hardware processors are further configured by the instructions to dynamically update at least one of the array structure and the linked list based on the incoming input data and the reference data.

In yet another aspect, there are provided one or more non-transitory machine readable information storage mediums comprising one or more instructions which when executed by one or more hardware processors cause receiving a plurality of input data and a corresponding reference data for each of the plurality of input data; creating a data structure for storing the plurality of input data, wherein the data structure is created in at least one form comprising an array structure or a linked list, and wherein the created data structure further comprises a plurality of data pointers defined for each of the plurality of input data; determining a unique set of data pointers from the plurality of data pointers for each of the plurality of input data, wherein the unique set of data pointers is determined by computing a range of candidate data pointers varying around the corresponding reference data. In an embodiment, the range is configurable and is determined based on the corresponding reference data. The method further comprising defining, (i) the unique set of data pointers in the array structure and (ii) remaining data pointers from the plurality of data pointers, in the linked list; determining for a new input data, using a delta based mechanism, a data pointer, from one of (i) the unique set of data pointers defined in the array structure or (ii) the remaining data pointers from the plurality of data pointers, in the linked list, wherein during determination of the data pointer a node corresponding to the determined data pointer is created. In an embodiment, the delta based mechanism determines a difference between value of the reference data and the new input data, and wherein the difference is indicative of an index value for determining the data pointer. In an embodiment, the method further comprising forming another linked list from the created node corresponding to the determined data pointer for storing subsequent input data. The method further comprising storing, the new input data at an address of one of the array structure or the linked list pointed by the determined node associated with the data pointer. In an embodiment, the method further comprising dynamically updating at least one of the array structure and the linked list based on the incoming input data and the reference data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
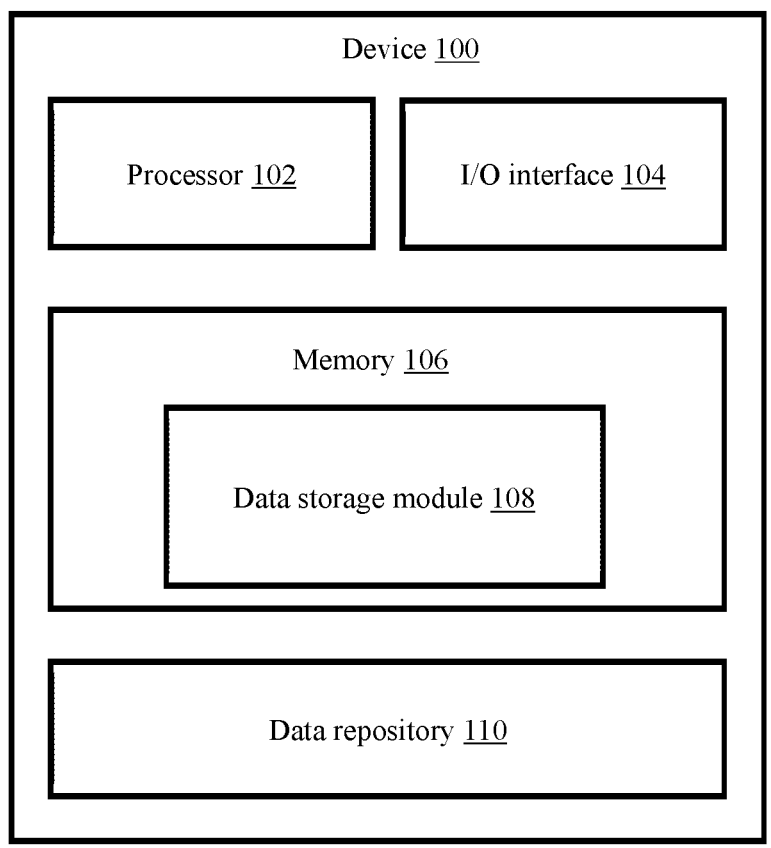
FIG. 1 illustrates a functional block diagram of a system (device) for storing data in an integrated array and linked list based structure, according to some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide systems and methods for storing data in an integrated array and linked list based structure. The typical way of storing data in conventional data processing systems by using either full linked list structure or full array structure has been modified to provide improved memory utilization and time efficiency. The disclosure provides a method of efficiently storing the data in a data processing system. The method provides an integrated array and linked list based structure for storing the data using a delta based mechanism. The array structure stores a plurality of unique data pointers. The plurality of unique data pointers comprises all the possible data pointers separated by a configurable range around the reference data. The configurable range of data pointers is determined based on the reference data which is further determined based on system requirements, market conditions, user requirements and the like. The linked list structure stores the remaining data pointers which are not specified in the configurable range. The disclosure enables faster access and processing of data pointers stored in the array structure and slower access and processing of data pointers stored in the linked list structure. The integrated array and linked list based structure help in reducing latency and improving memory utilization.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 illustrates a functional block diagram of a system for storing data in an integrated array and linked list based structure, according to some embodiments of the present disclosure. The system 100 includes or is otherwise in communication with one or more hardware processors such as a processor 106, an I/O interface 104, at least one memory such as a memory 102, and a data storage module 108. In an embodiment, the data storage module 108 can be implemented as a standalone unit in the system 100. In another embodiment, the data storage module 108 can be implemented as a module in the memory 102. The processor 106, the I/O interface 104, and the memory 102, may be coupled by a system bus.

The I/O interface 104 may include a variety of software and hardware interfaces, for example, a web interface, a graphical user interface, and the like. The interfaces 104 may include a variety of software and hardware interfaces, for example, interfaces for peripheral device(s), such as a keyboard, a mouse, an external memory, a camera device, and a printer. The interfaces 104 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 104 may include one or more ports for connecting a number of computing systems with one another or to another server computer. The I/O interface 104 may include one or more ports for connecting a number of devices to one another or to another server.

The hardware processor 106 may be implemented as one or more microprocessors, microcomputers, microcontrollers, digital signal processors, central processing units, state machines, logic circuitries, and/or any devices that manipulate signals based on operational instructions. Among other capabilities, the hardware processor 106 is configured to fetch and execute computer-readable instructions stored in the memory 102.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes the plurality of modules 108 and a repository 110 for storing data processed, received, and generated by one or more of the modules 108. The modules 108 may include routines, programs, objects, components, data structures, and so on, which perform particular tasks or implement particular abstract data types.

The data repository 110, amongst other things, includes a system database and other data. The other data may include data generated as a result of the execution of one or more modules in the modules 108. The system database stores input data and a corresponding reference data for input data, a set of data pointers stored in an integrated array and linked list based structure which is generated as a result of the execution of one or more modules in the modules 108. The data stored in system database can be dynamically updated based on change in requirements pertaining to different applications.

In an embodiment, the data storage module 108 can be configured to store and process data in an integrated array and linked list based structure. Storing data in an integrated array and linked list based structure can be carried out by using methodology, described in conjunction with FIGS. 2 through 5 and use case examples.

Figure 2:
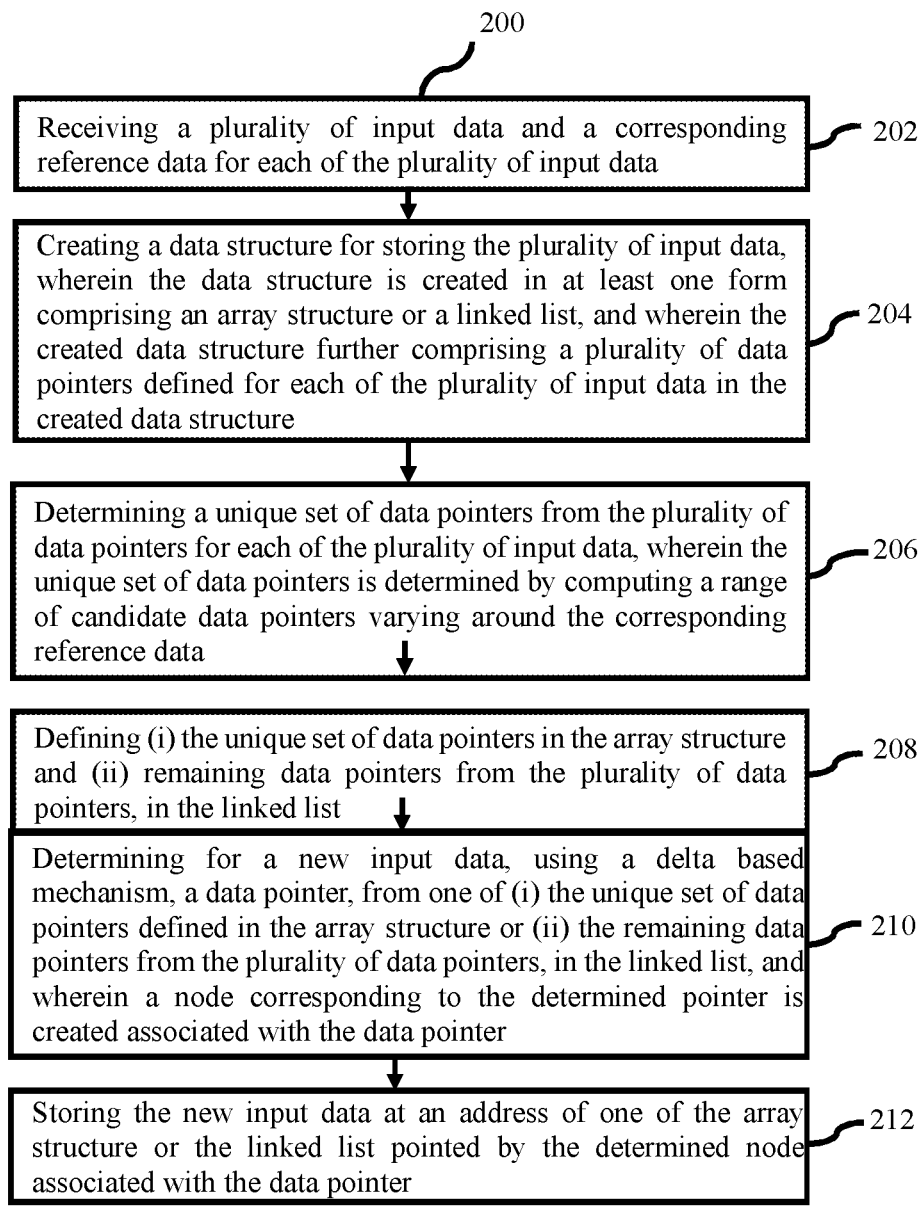
FIG. 2 illustrates an exemplary flow diagram of a processor implemented method for storing data in an integrated array and linked list based structure, in accordance with some embodiments of the present disclosure.

FIG. 2, with reference to FIG. 1, is an exemplary flow diagram of a processor implemented method for storing data in an integrated array and linked list based structure using the data storage module 108 of FIG. 1, in accordance with some embodiments of the present disclosure. In an embodiment of the present disclosure, at step 202 of FIG. 2, the one or more hardware processors 106 receive, a plurality of input data and a corresponding reference data for each of the plurality of input data. In an embodiment, the input data may comprise but are not limited to a plurality of incoming orders, received at different time stamps, pertaining to one or more trading applications. The one or more trading applications may include security trading, retail trading, stock exchange, and the like. In an embodiment, the incoming orders may comprise but not limited to buy/sell requests, bids, and transactions that are placed with a price value on the security, stock shares, futures, options, swaps or other derivatives, currencies, bonds, or other physicals like corn, precious metals, electricity, and/or other items traded on the exchange associated with trade for other securities or items. In an embodiment, the corresponding reference data for each of the plurality of input data may comprise but not limited to an initial price of the plurality of the incoming orders pertaining to the one or more trading applications. In an embodiment, the reference data (e.g., initial price) is configurable and determined based on an analysis of closing price of orders in previous day, analysis of market conditions, wherein the market conditions is determined based on the need of traded item, consumption of the traded item by users, production or manufacturing of the traded item, and availability of the traded item. For example, in a stock exchange scenario, the initial price of stock shares for a company X could be but not limited to 100$. The initial price is assumed to be determined at a particular time stamp. Further, it is assumed that price of incoming orders for stock shares of the company X, received at different time stamps in a day, could be but not limited to 1$ to 1000$ such as $80, $120, $280, $320 and the like.

Referring back to FIG. 2, at step 204, a data structure is created for storing the plurality of input data using the one or more processors, wherein the data structure is created in at least one form comprising an array structure or a linked list. In an embodiment, the created data structure further comprising a plurality of data pointers defined for each of the plurality of input data in the created data structure. In an embodiment, size of the array structure and the linked list structure is configurable based on the size of the system memory and can accommodate the maximum available memory size available to the system. In an embodiment, the data pointers may comprise but not limited to price pointers of the incoming orders pertaining to the one or more trading applications. In another embodiment, the data pointers defined in the created data structure could be associated with a plurality of time stamps, wherein the plurality of time stamps are structured as another linked list (alternatively referred as a time linked list). In an embodiment, the array structure and the linked list structure hold the price pointers of the incoming orders pertaining to the one or more trading applications at different time stamps. In other words, the array structure and the linked list structure comprises a plurality of data pointers (e.g., price pointers) associated with a time linked list, wherein the incoming orders of a particular price (e.g., 120$) received at different time stamps are stored in the time linked list associated with the corresponding data pointer (e.g., price pointer) defined in the created data structure.

Figure 3:
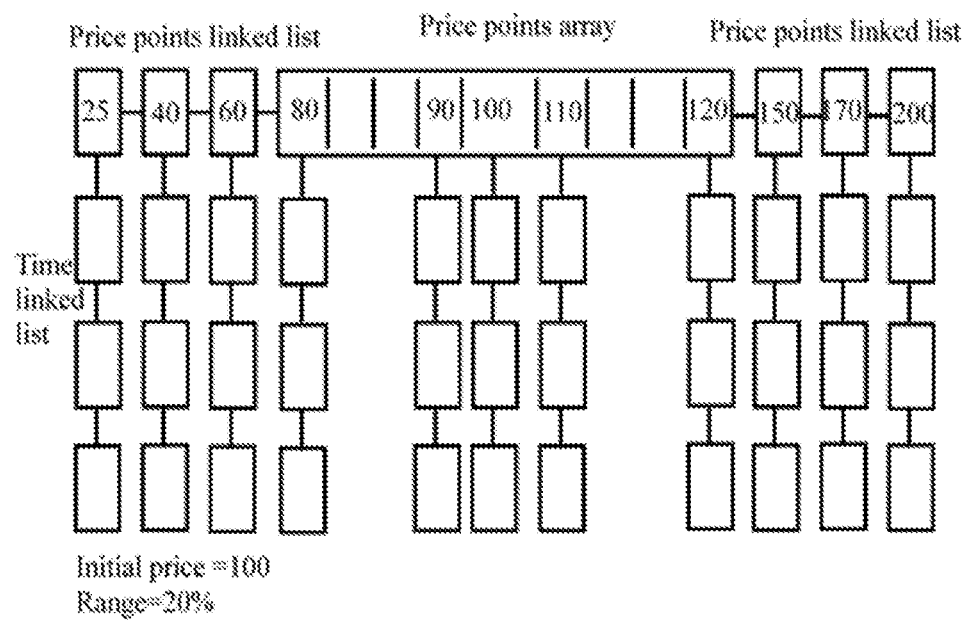
FIG. 3 illustrates an example of a processor implemented method for storing data in an integrated array and linked list based structure, in accordance with some embodiments of the present disclosure.

Referring back to FIG. 2, as depicted in step 206, the one or more processors determine a unique set of data pointers from the plurality of data pointers for each of the plurality of input data. In an embodiment, the unique set of data pointers is determined by computing a range of candidate (interchangeably referred as possible) data pointers varying around the corresponding reference data. In an embodiment, the range of candidate (interchangeably referred as possible) data pointers is determined based on the corresponding reference data. For example, it is assumed that the prices of stock shares, securities, items and the like pertaining to the one or more trading applications do not vary by more than ±20 to 30 percent of the initial price. In an embodiment, based on the assumption, the range of candidate (interchangeably referred as possible data pointers could be computed by finding but not restricted to ±20 or 30 percent variation from the corresponding reference data. The step of determining the unique set of data pointers from the plurality of data pointers for each of the plurality of input data is further explained with an example shown in FIG. 3. As depicted in FIG. 3, for the corresponding reference data (e.g., initial price) selected as 100$, the unique set of data pointers are determined as the data pointers ranging from 80$ to 120$. The range (e.g., 80$ to 120$) is determined by finding ±20 percent variation from the corresponding reference data (e.g., initial price which is 100$ in this case), wherein the +20 percent variation refers to value 120$ (which is highest limit of the range in this case) and −20 percent variation refers to value 80$ (which is lowest limit of the range in this case). In an embodiment, the range is configurable. For example, the range can be set with 20 or 30 percent variation from the corresponding reference data, and can be changed to different values such as ±10 percent variation, ±40 percent variation, ±50 percent variation and the like from the corresponding reference data. In an embodiment, one or more data pointers comprised in the unique set of data pointers are separated by a pre-defined step size. For example, as depicted in FIG. 3, the predefined step size for separating the one or more data pointers comprised in the unique set of data pointer is 1$. Thus, as depicted in FIG. 3, the unique set of data pointers refers to values 80$, 81$, 82$ till 120$. In another embodiment, the pre-defined step size is selected based on the system configuration and the type of application. For example, in trading system applications, the step size depicts the minimum difference of price variation. Suppose if the step size is selected as 1$, then the price cannot be changed by a value less than 1$. The step size remains fixed for every trading system organization to keep uniformity in the requested prices. Further, in cases when the step size is not pre-defined, users may request for a step size (e.g. price difference) of say 0.0005$. Such requests pose a challenge of maintenance and encashment in the trading system since 0.0005$ may no more be valid currency in the market.

Further, as depicted in step 208 of FIG. 2, the one or more processors define (i) the unique set of data pointers in the array structure and (ii) remaining data pointers from the plurality of data pointers, in the linked list. As depicted in FIG. 3, the unique set of data pointers comprising of values 80$, 81$, 82$ till 120$ are defined in the array structure and remaining data pointers such as 25$, 40$, 60$, 150$, 170$, and 200$ are defined in the linked list structure.

Referring back to FIG. 2, at step 210, the one or more processors determine for a new input data, using a delta based mechanism, a data pointer, from one of (i) the unique set of data pointers defined in the array structure or (ii) the remaining data pointers from the plurality of data pointers, in the linked list. In an embodiment, when the data pointer is determined, the system creates a node corresponding to the determined data pointer. In an embodiment of the present disclosure, the created node is utilized by the system 100 for forming another linked list which is used for subsequent data processing and storage. In another embodiment, the another linked list (alternatively referred as a time linked list) formed from the created node further comprises one or more nodes arranged in a vertical order. In an embodiment, the one or more nodes comprised in the another linked list (alternatively referred as a time linked list) represent different time stamps at which the plurality of incoming orders are received. In an embodiment, the delta based mechanism is utilized to determine a difference between value of the reference data and the new input data. In an embodiment, the difference is indicative of an index value for determining the node associated with the data pointer. In another embodiment, the delta based mechanism helps in identifying the location for storing the new input data in the created data structure. In other words, for a new incoming order, the delta based mechanism helps in determining the location in the created data structure where the new incoming order can be placed or stored. The delta based mechanism, can be further understood with reference to FIG. 3. For example, as depicted in FIG. 3, for a new input data received with value 80$, a difference (interchangeably referred as a delta value) between value of the reference data (in this case 100$) and the new input data (in this case 80$) is determined. In this case, difference (interchangeably referred as a delta value) between value of the reference data and the new input data is computed as 20$ (e.g., $100−$80=$20). In an embodiment, the difference (interchangeably referred as a delta value) helps in identifying if the determined data pointer exists in the array structure or the linked list. For example, if the difference (interchangeably referred as a delta value) falls in range of candidate (interchangeably referred as possible) data pointers (e.g., price pointers), then the determined data pointer exists in the array, else the determined data pointer exists in the linked list. Further, the difference (interchangeably referred as a delta value) is used to determine an index value which is indicative of a location in the created data structure to place or store the new incoming order. In this case the index value is computed as 80 (e.g., index value=100−20). In this case, the index value is 80 which indicates of a data pointer defined in the array structure. In the array structure, at the location 80, a new node is created which corresponds to the data pointer 80$. Further, as shown in FIG. 3, another linked list (alternatively referred as time linked list) comprising of the one or more nodes arranged in the vertical order, is created from the created node for placing or storing the subsequent input data (e.g., plurality of incoming orders received at different time stamps). Thus for this step, the reference data and difference (interchangeably referred as a delta value) are used for identifying the location where the incoming node is to be placed.

Further, as depicted in step 212 of FIG. 2, the new input data is stored at an address of the created node corresponding to the determined data pointer comprised in one of the array structure or the linked list. For example, as depicted in FIG. 3, it is assumed that an incoming order of price say 120$ is received at a time t1 (say 5:00 PM.). Further, using the proposed method, it is determined whether the data pointer (e.g., price pointer) corresponding to the incoming order of price 120$ exists in the array structure. Further, a node corresponding to the data pointer is created in the array structure, wherein the created node represents the location pointed by the corresponding data pointer (in this case, node is created at location 120$ in the array structure). Further, the incoming order of price say 120$ is placed or stored at the address of created node in the array structure. Further, another incoming order of the price 120$ is received at time t2 (say 5:10 PM.). For storing the another incoming order of the same price, the another linked list (alternatively referred as time linked list) is formed from the created node, wherein the another linked list may comprise one or more nodes arranged in a vertical order of time. The incoming order of the price 120$ received at t2 is stored in the one or more nodes comprised in the another linked list in a descending order of time. In a similar way, incoming orders of price say 200$ which are not identified in the array structure, are stored in the one or more nodes comprised in the another linked list associated with the linked list structure. In an embodiment, the new input data is stored in the array structure if the data pointer for the new input data is determined from the unique set of the data pointers, otherwise stored in the linked list if the data pointer for the new input data is determined from the data pointers not comprised in the unique set of the data pointers.

Figure 4:
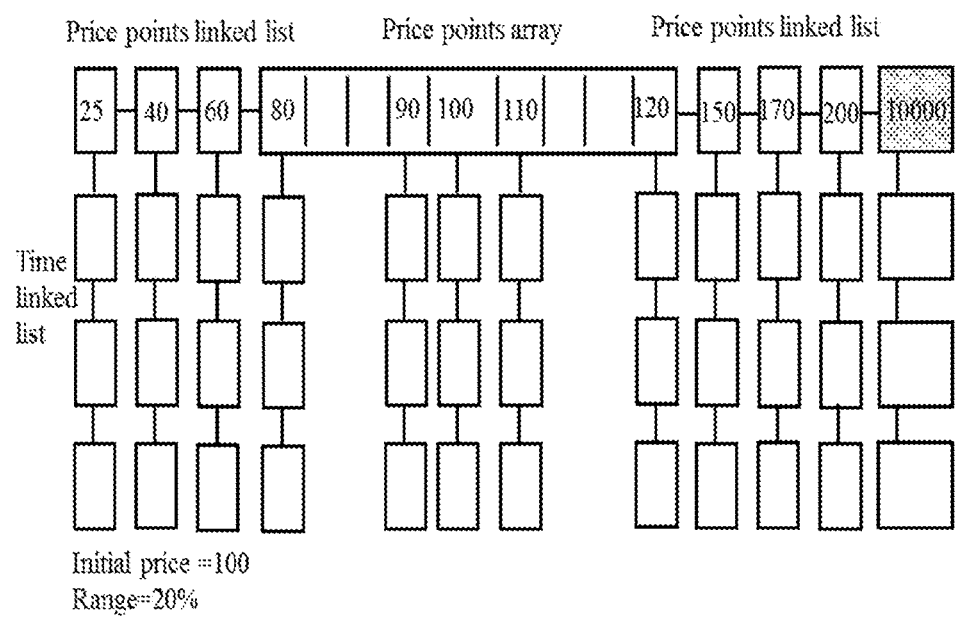
FIG. 4 illustrates an example of a processor implemented method for storing data in an integrated array and linked list based structure, in accordance with some embodiments of the present disclosure.

In an embodiment, the one or more processors are further configured to dynamically update at least one of the array structure and the linked list based on the incoming input data. For example, as shown in FIG. 3, the created data structure initially provides a provision for storing data at locations from 25 to 200. Thus, the data structure shown in FIG. 3 cannot store data for an incoming input data (e.g., incoming order) of price more than 200$. However, the system dynamically updates the linked list structure by creating a node at the extreme end of the linked list when the price of incoming input (e.g., incoming order) data exceeds the size of the data structure. The created node corresponds to a data pointer pointing to the location where the incoming input data (e.g. incoming order) has to be placed or stored. For example, as depicted in FIG. 4, when the incoming input data (e.g., incoming order) of price 10000$ is received, the linked structure is updated by creating a node corresponding to data pointer 10000$ at the extreme end of the linked list and the incoming input data (e.g. incoming order) of price 10000$ is stored or placed at that location.

Figure 5:
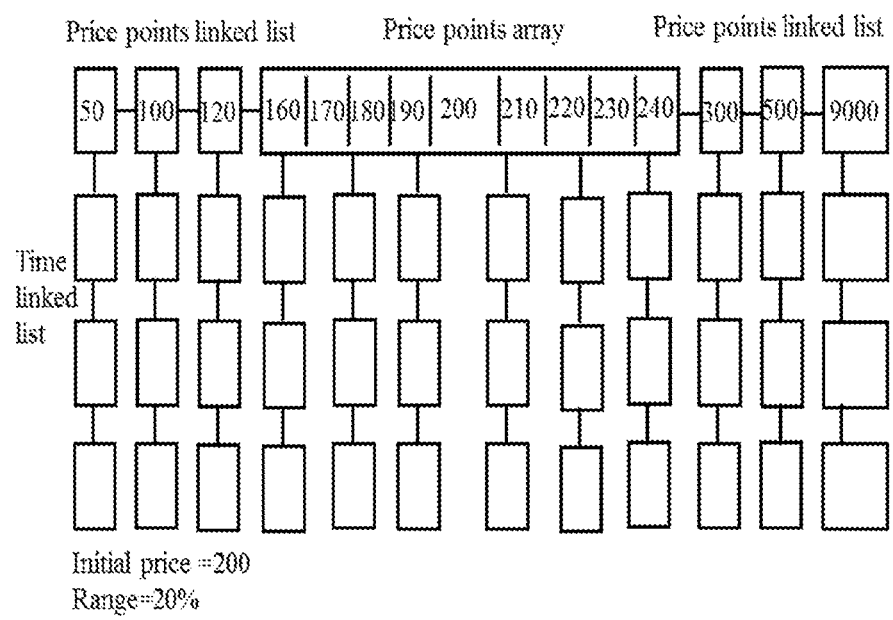
FIG. 5 illustrates an example of a processor implemented method for storing data in an integrated array and linked list based structure, in accordance with some embodiments of the present disclosure.

In an embodiment, the one or more processors are further configured to dynamically update at least one of the array structure and the linked list based on the reference data. In another embodiment, the reference data is configurable and may change with the time. In another embodiment, the reference data may remain constant for a day but may change to a different value on another day. In an embodiment, with the change in value of reference data, the size of the array structure gets dynamically updated. For example, as shown in FIG. 3, the reference data is assumed to be 100$ and based on the ±20 percent variation, the range of candidate (interchangeably referred as possible) data pointers (e.g., price pointers) comprised in the array structure is 80$ to 120$. As depicted in FIG. 5, when the reference data changes to a value 200$, the range of candidate (interchangeably referred as possible) candidate data pointers (e.g. price pointers), comprised in the array structure, computed based on ±20 percent variation changes to 160$ to 240$. Thus, it is evident that the size of array gets dynamically updated to double of its initial size.

Experimental Results

In an embodiment, a comparative analysis of conventional data storage and processing systems with the proposed system is provided. In an embodiment, the conventional data storage and processing systems may provide a fully array based implementation for storing the plurality of input data. The conventional systems using fully array based structure comprises of a plurality of data pointers and stores all the input data at an address of the array structure only which is determined by the corresponding data pointer. However, the fully array based structure may occupy more and unnecessary (or unavoidable) space and memory when defined with a large number of data pointers for storing or placing the incoming orders. In an embodiment, it is observed that the prices of stock shares, securities, items and the like pertaining to the one or more trading applications, for a particular time frame (e.g., a day, a year, etc.), do not vary by a large amount and gets confined to a range around the initial price, wherein the range could be but not restricted to ±20 to ±30 percent of the initial price. In other words, it is observed that the incoming orders usually come at locations which are 20-30% of the initial price and beyond these values the populating of orders is very sparse. Thus, the fully array based implementation, storing a large number of data pointers pointing to a location for storing an incoming order, may lead to wastage of memory. For example, a fully array based structure is designed for a plurality of incoming order with data pointers 1$ to 10000$. Further, even for the reference data (e.g., initial price) say 200$, with fully array based implementation, 10000 locations are provisioned. However, with reference data selected as 200, the possible price range of received incoming orders could be around but not restricted to 2000-3000. Thus, there is a requirement of provision for only 2000-3000 locations whereas the fully array based structure is provisioning for 10000 locations. Thus, the fully array based implementation, storing a large number of data pointers pointing to a location for storing an incoming order, may lead to wastage of memory.

In an embodiment, the conventional data storage and processing systems may provide a fully linked based implementation for storing the plurality of input data. The fully linked list based implementation requires that to get to any location pointed by a corresponding data pointer, the linked list is needed to be traversed from a first node depicting a first location pointed by the corresponding data pointer till a desired node depicting a desired location pointed by the corresponding data pointer. Thus if the linked list is of size N, then it would take N number of nodes to be traversed. The traversal through N number of nodes for arriving at a desired node may result in delayed processing leading to time consuming activity. Thus, time complexity of a linked list of size N is provided as O (N). The time complexity represents the computational complexity that describes the amount of time system takes to run an algorithm. The time complexity is commonly estimated by counting the number of elementary operations performed by the algorithm. In an embodiment, the complexity of computation is said to be O(N) if the time taken for computing is directly proportional to the input size (say N). Symbol O(N) is read as "Order of N" which means that the running time increases at most linearly with the size of the input. In other words, it is depicted that there is a constant c such that the running time is at most cn for every input of size n. For example, a procedure that adds up all elements of a list requires time proportional to the length of the list, if the adding time is constant, or, at least, bounded by a constant. In an embodiment, the latency for search/insert/delete should be minimum for a data processing system. However, with the conventional fully linked based implementation, there is no provision for reducing the latency. For example, a linked list is created with four nodes depicting four locations pointed by the corresponding data pointers and index values for the four nodes are assumed to be say 80, 120, 280 and 320. Then, in this case, the linked list will be formed as follows

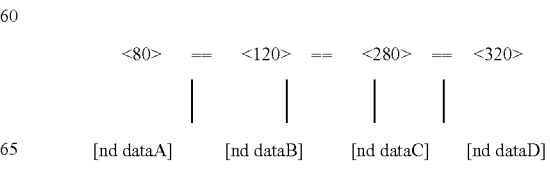

Here, the nodes symbolized as 'nd' are created for each received input data (e.g., incoming orders), wherein the received input data can be denoted by data A, data B, data C, and data D. As can be seen in the above mentioned linked list which is a horizontal linked list, that the first node is 80. Further, a new input data (e.g., new incoming order) denoted as data C is received. For storing or placing the new input data, a new node depicting a new location pointed by the corresponding data pointer is created and inserted in the linked list. The index value of new node is say 280. In this case, for inserting the new node with index value 280 in the above mentioned linked list, traversal from node with index value 80 to node with index value 120 and further to node with index value 280 is required. It can be seen, that the new node is the desired node. Upon reaching location 280, the new node with new input data denoted as data C is added and stored in the linked list. It is evident that using fully linked list based implementation, 3 steps of traversal are required in this case. Thus time taken is 3 units.

In an embodiment, the present disclosure provides a modification over existing conventional systems and methods, wherein the modification helps in optimizing the memory utilization and reducing latency to provide time efficient system. The present disclosure provides an integrated array and linked list based structure for storing the input data. The array structure proposed in the present disclosure comprises a plurality of locations pointed by a plurality data pointers for storing a plurality of input data, wherein the plurality of locations comprised in the array structure are provisioned for a range of candidate (interchangeably referred as possible) prices for input data (e.g., incoming orders) determined for a particular time frame. The range of candidate (interchangeably referred as possible) prices for input data is determined by computing a variation in the price of input data from a reference data (e.g., initial price). It is observed that the price of all orders received in a day for one or more applications such as trading system application gets confined in the price range around the initial price, so the input data (e.g., incoming orders) having prices falling in the determined range of candidate (interchangeably referred as possible) prices only, are stored in the array structure. Since, the array structure is provisioned for the determined range of candidate (interchangeably referred as possible) prices only, the size of the array structure can be reduced. Thus the present disclosure helps in optimization of memory by utilizing less memory. Further, the array structure enables fast processing and thereby reduces the time complexity. The probability of receiving input data (e.g., incoming orders) beyond the determined range of candidate (interchangeably referred as possible) prices are very less, so the input data (e.g., incoming orders) having prices beyond the determined range of candidate (interchangeably referred as possible) prices, are stored in the linked list structure since the linked list structure does not occupy much space. As there are less chances of receiving an input data (e.g., incoming order) with a price exceeding the determined range of candidate (interchangeably referred as possible) prices, the need for searching/inserting/storing the input data in the linked list is minimum which results in reduced latency and is time efficient. The optimization of memory and time with the proposed disclosure can be further explained by a non-limiting example. In the example, a data structure is created with four nodes depicting four locations pointed by the corresponding data pointers and the index values for the four nodes are assumed to be say 80, 120, 280 and 320. Also, it is assumed that the reference data (e.g., initial price) is selected as 200. Then, in this case, the data structure will be formed as follows

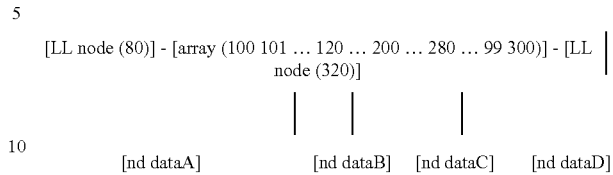

Here, the nodes are created for each received input data (e.g., incoming orders), wherein the received input data can be denoted by data A, data B, data C, and data D (same example as described above). As can be seen in the above mentioned data structure, a plurality of data pointers with a range 100$ to 300$ are defined in the array structure since the range of candidate (interchangeably referred as possible) price around the initial price for the input data is determined by computing +/−50% variation from the initial price with the values from 100$ to 300$. Further, it can be seen from the above-mentioned data structure that the nodes with index value 80 and 320 respectively are comprised in the linked list (LL). Suppose a new input data (e.g., new incoming order) denoted as data C is received (same example as described above). For storing or placing the new input data, a new node depicting a new location pointed by the corresponding data pointer is created and inserted in the linked list. The index value of new node is say 280. In this case, for inserting the new node with index value 280 in the above mentioned data structure, the difference between the (delta value) is computed which would be say (280−200)=80 and data pointer pointing to the corresponding location is determined by moving +80 count in the array structure. At the location 280, the desired node is identified. The proposed disclosure for this case, instead of traversing from node with index value 80 to node with index value 120 and further to node with index value 280 as performed in fully linked list based implementation, directly identifies the node with index value 280 in the array structure using delta based mechanism and stores or place the new input data at the address of the identified node. Further, the array structure enables fast processing. It can be seen, that the new node is the desired node. Upon reaching location 280, the new node with new input data denoted as data C is added and stored in the array structure. It is evident that by using the proposed data structure, only one step of traversal is required. Thus time taken is 1 unit instead of 3 units as provided by the conventional fully linked list based structure. The time complexity of the proposed data structure is time O(1) as opposed for nodes in array and O(M) for the nodes in the linked list, wherein M denotes the number of nodes comprised in the linked list. Thus, the proposed data processing and storage system provides an improvement in optimization of memory and time by incorporating advantages of both array structure and linked list structure, wherein the array structure provides faster processing and linked list structure provides efficient memory utilization by occupying less storage space.

The illustrated steps of method 200 are set out to explain the exemplary embodiments shown, and it should be anticipated that ongoing technological development may change the manner in which particular functions are performed. These examples are presented herein for purposes of illustration, and not limitation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
   receiving, by a processor, a plurality of input data and a corresponding reference data for each of the plurality of input data;
   creating a data structure for storing the plurality of input data, wherein the data structure is created in at least one form comprising an array structure or a linked list, wherein size of the array structure and the linked list structure is configurable based on the size of a system memory and wherein the created data structure further comprises a plurality of data pointers defined for each of the plurality of input data;
   determining a unique set of data pointers from the plurality of data pointers for each of the plurality of input data, wherein the unique set of data pointers is determined by computing a range of candidate data pointers varying around the corresponding reference data;
   defining, (i) the unique set of data pointers in the array structure and (ii) remaining data pointers from the plurality of data pointers, in the linked list;
   determining for a new input data, using a delta based mechanism, a data pointer to identify the location for storing the new input data in the created data structure, from one of (i) the unique set of data pointers defined in the array structure or (ii) the remaining data pointers from the plurality of data pointers, in the linked list, wherein during determination of the data pointer a node corresponding to the determined data pointer is created and wherein the delta based mechanism determines a difference between value of the reference data and the new input data; and
   storing, the new input data at an address of the created node corresponding to the determined data pointer comprised in one of the array structure or the linked list.

2. The method of claim 1, wherein the range is configurable and is determined based on the corresponding reference data.

3. The method of claim 1, wherein the difference determined by the delta based mechanism is indicative of an index value for determining the data pointer.

4. The method of claim 1, further comprising forming another linked list from the created node corresponding to the determined data pointer for storing subsequent input data.

5. The method of claim 1, further comprising dynamically updating at least one of the array structure and the linked list based on the new input data and the reference data.

6. A system, comprising:
a memory;
one or more communication interfaces; and
one or more hardware processors coupled to said memory through said one or more communication interfaces, wherein said one or more hardware processors are configured to:
receive, by a processor, a plurality of input data and a corresponding reference data for each of the plurality of input data;
create a data structure for storing the plurality of input data, wherein the data structure is created in at least one form comprising an array structure or a linked list, wherein size of the array structure and the linked list structure is configurable based on the size of a system memory and wherein the created data structure further comprises a plurality of data pointers defined for each of the plurality of input data;
determine a unique set of data pointers from the plurality of data pointers for each of the plurality of input data, wherein the unique set of data pointers is determined by computing a range of candidate data pointers varying around the corresponding reference data;
define (i) the unique set of data pointers in the array structure and (ii) remaining data pointers from the plurality of data pointers, in the linked list;
determine for a new input data, using a delta based mechanism, a data pointer to identify the location for storing the new input data in the created data structure, from one of (i) the unique set of data pointers defined in the array structure or (ii) the remaining data pointers from the plurality of data pointers, in the linked list, wherein during determination of the data pointer a node corresponding to the determined data pointer is created and wherein the delta based mechanism determines a difference between value of the reference data and the new input data; and
store, the new input data at an address of the created node corresponding to the determined data pointer comprised in one of the array structure or the linked list.

7. The system of claim 6, wherein the range is configurable and is determined based on the corresponding reference data.

8. The system of claim 6, wherein the difference determined by the delta based mechanism is indicative of an index value for determining the data pointer.

9. The system of claim 6, wherein said one or more hardware processors are further configured to form another linked list from the created node corresponding to the determined data pointer for storing subsequent input data.

10. The system of claim 6, wherein said one or more hardware processors are further configured to dynamically update at least one of the array structure and the linked list based on the new input data and the reference data.

11. One or more non-transitory machine readable information storage mediums comprising one or more instructions which when executed by one or more hardware processors cause:
receiving, by a processor, a plurality of input data and a corresponding reference data for each of the plurality of input data;
creating a data structure for storing the plurality of input data, wherein the data structure is created in at least one form comprising an array structure or a linked list, wherein size of the array structure and the linked list structure is configurable based on the size of a system memory and wherein the created data structure further comprises a plurality of data pointers defined for each of the plurality of input data;
determining a unique set of data pointers from the plurality of data pointers for each of the plurality of input data, wherein the unique set of data pointers is determined by computing a range of candidate data pointers varying around the corresponding reference data;
defining, (i) the unique set of data pointers in the array structure and (ii) remaining data pointers from the plurality of data pointers, in the linked list;
determining for a new input data, using a delta based mechanism, a data pointer to identify the location for storing the new input data in the created data structure, from one of (i) the unique set of data pointers defined in the array structure or (ii) the remaining data pointers from the plurality of data pointers, in the linked list, wherein during determination of the data pointer a node corresponding to the determined data pointer is created and wherein the delta based mechanism determines a difference between value of the reference data and the new input data; and
storing, the new input data at an address of the created node corresponding to the determined data pointer comprised in one of the array structure or the linked list.

12. The one or more non-transitory machine readable information of claim 11, wherein the range is configurable and is determined based on the corresponding reference data.

13. The one or more non-transitory machine readable information of claim 11, wherein the difference determined by the delta based mechanism is indicative of an index value for determining the data pointer.

14. The one or more non-transitory machine readable information of claim 11, wherein said one or more hardware processors are further configured to form another linked list from the created node corresponding to the determined data pointer for storing subsequent input data.

15. The one or more non-transitory machine readable information of claim 11, wherein said one or more hardware processors are further configured to dynamically update at least one of the array structure and the linked list based on the new input data and the reference data.

* * * * *